Jan. 21, 1936.  J. O. HEINZE  2,028,603
TURBO AIR COMPRESSOR
Filed Aug. 30, 1933  3 Sheets-Sheet 2
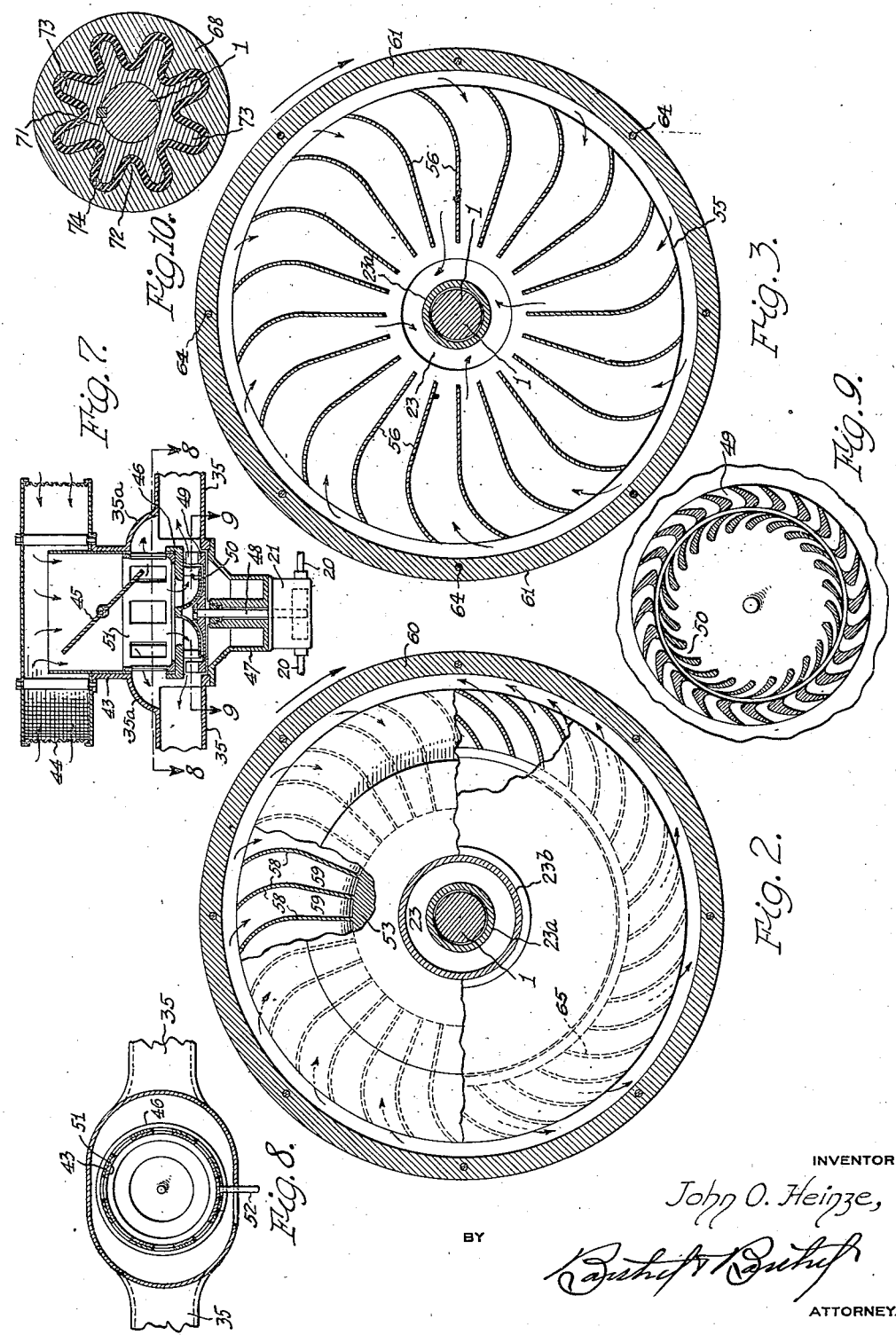
INVENTOR
John O. Heinze,
BY
ATTORNEYS Jan. 21, 1936. J. O. HEINZE 2,028,603
TURBO AIR COMPRESSOR
Filed Aug. 30, 1933 3 Sheets-Sheet 3
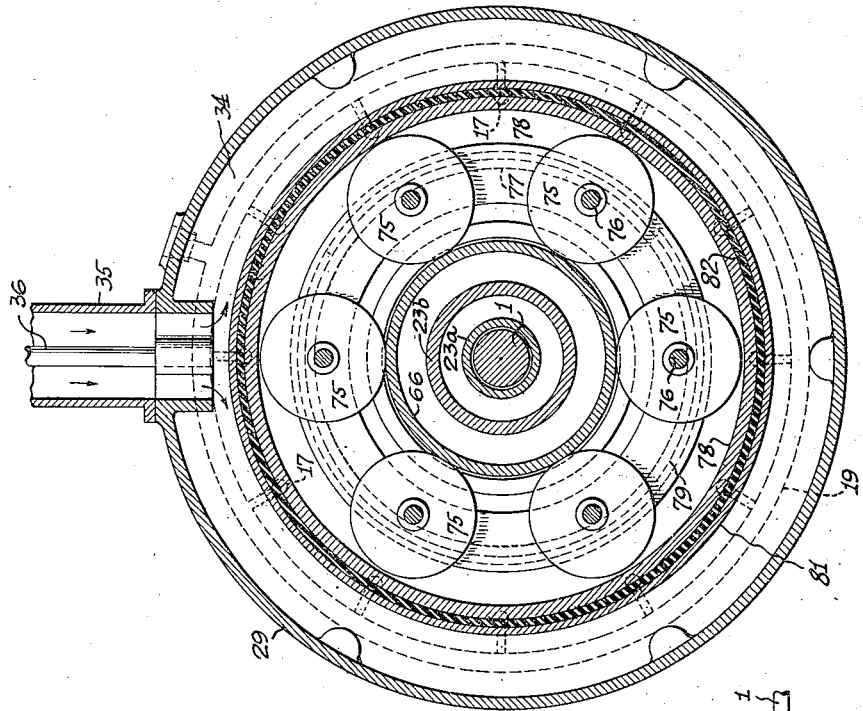
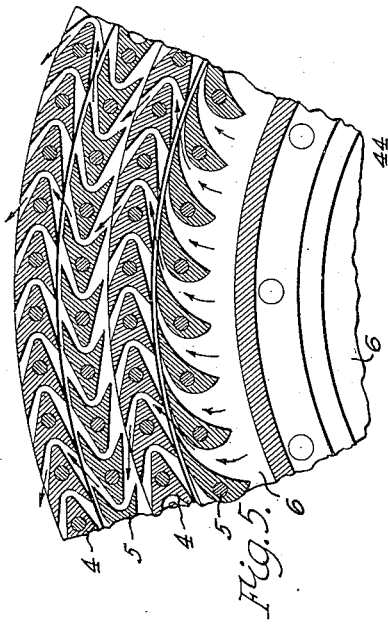
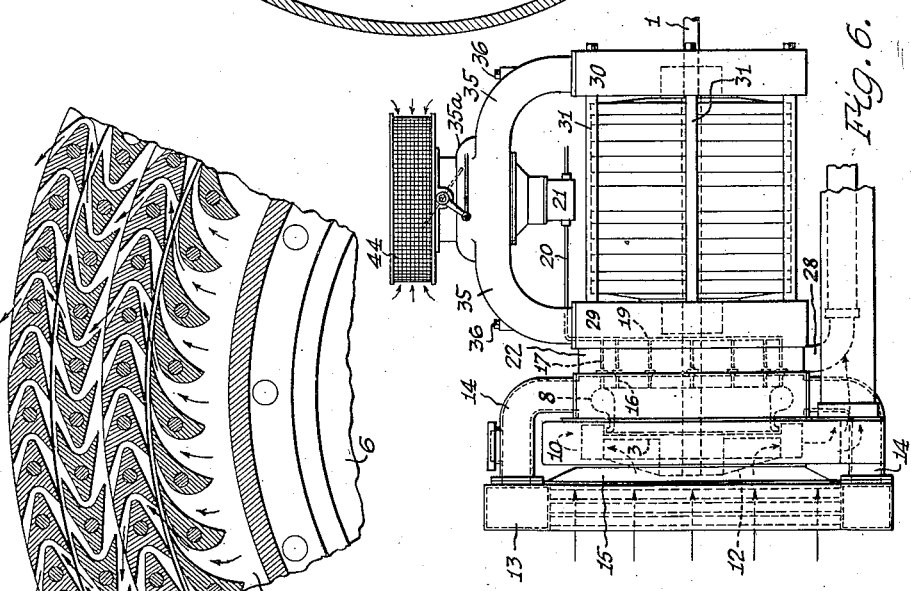
INVENTOR
John O. Heinze,
BY
ATTORNEYS Patented Jan. 21, 1936

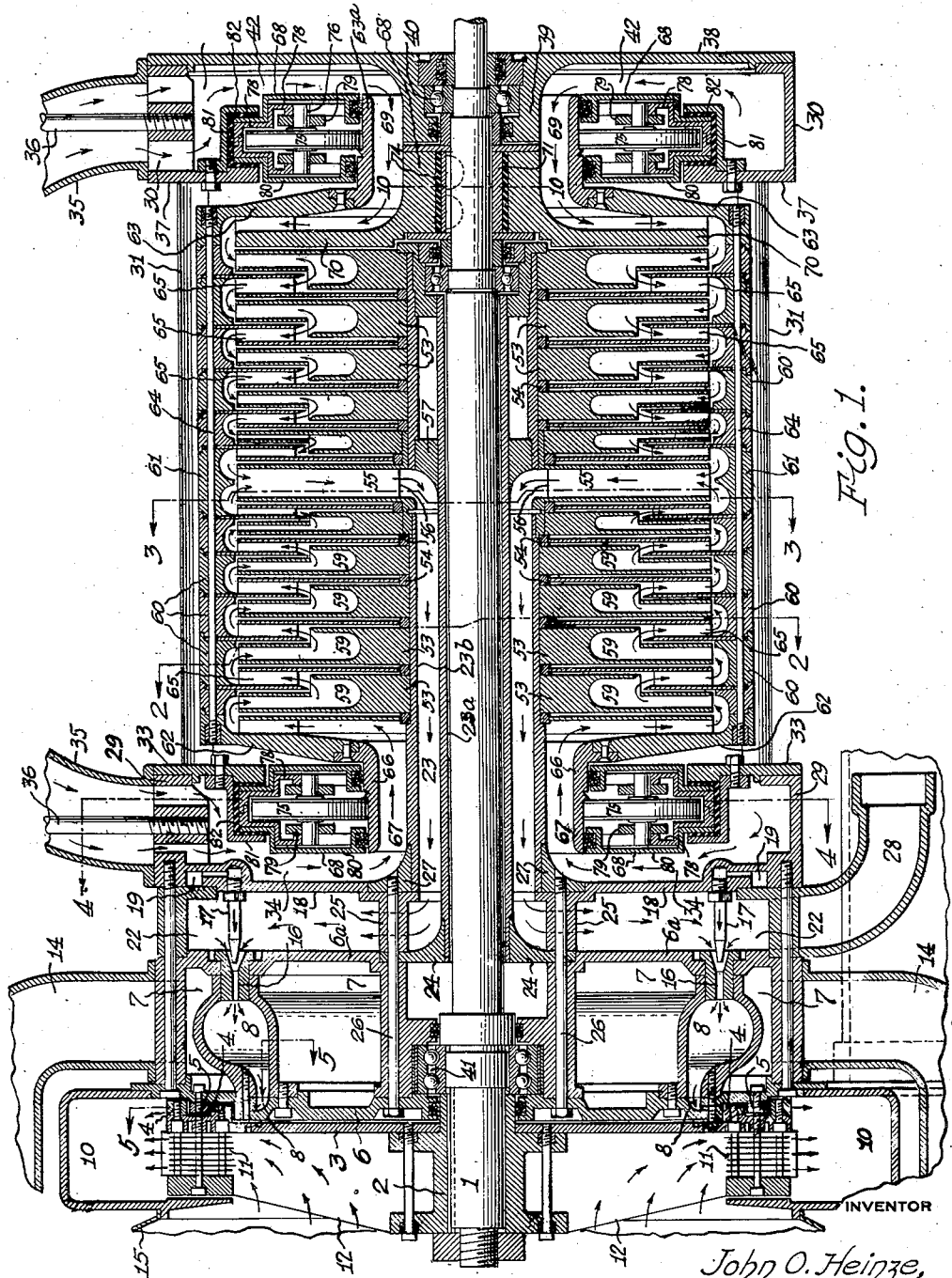

2,028,603

UNITED STATES PATENT OFFICE 2,028,603

TURBO AIR COMPRESSOR

John O. Heinze, Detroit, Mich., assignor to Heinze Development Company, a corporation of Michigan Application August 30, 1933, Serial No. 687,459

13 Claims. (Cl. 230—127)

This invention relates to a turbo compressor or air pump and to a turbine engine especially adapted for driving the same.

An object of the invention is to provide an arrangement of turbo air pump whereby all end thrust on the rotor thereof is eliminated and leakage of air prevented, so that the full capacity of the pump will be delivered into the final outlet conduit.

A further object is to provide a particular arrangement and combination of turbo pump and turbine engine, whereby a continuous supply of air under pressure is supplied by the pump for admixture with fuel to supply a continuous flow of combustible vapor to the engine and by continuous combustion of such vapor, create, by expansion, a force to drive the turbine, the rotor of which is directly connected to the rotor of the pump in such a manner that the volume of air under pressure, supplied by the pump, in excess of that admitted to the engine, may be utilized as driving power for other devices.

It is also an object to provide a directly driven high speed turbo air pump wherein the rotor of the pump is so supported as to eliminate the transmission of vibration, and so that said rotor may freely center itself at high speeds, within its bearings, and to provide an anti-friction bearing for such rotor which bearing is necessarily of large diameter due to the arrangement in such pump, and which bearing will function in supporting the rotor at such high speeds, without undue wear and generation of high heat.

Other objects of the present construction, arrangement and combination of elements in a turbine engine-driven turbo pump, will more fully appear by referring to the following description and to the drawings, wherein—

Figure 1 is a central, longitudinal, vertical section through a combined turbo air pump and turbine engine illustrative of an embodiment of the present invention;

Fig. 2 is a transverse section substantially upon the line 2—2 of Fig. 1, with parts broken away and in section;

Fig. 3 is a transverse section substantially upon the line 3—3 of Fig. 1;

Fig. 4 is a transverse section substantially upon the line 4—4 of Fig. 1;

Fig. 5 is a sectional detail substantially upon the line 5—5 of Fig. 1;

Fig. 6 is a side elevation of the complete assembly drawn to a reduced scale;

Fig. 7 is a vertical sectional detail of the air strainer, air inlet with regulating valve, fuel pump, and throttle valve;

Fig. 8 is a horizontal section through the air control valve substantially upon the line 8—8 of Fig. 7;

Fig. 9 is a horizontal sectional detail of the turbine drive for the fuel pump, substantially upon the line 9—9 of Fig. 7; and Fig. 10 is a transverse sectional detail substantially upon the line 10—10 of Fig. 1, of the driving connection between the main drive shaft and hub of the pump rotor.

As shown in the drawings, 1 indicates a central drive shaft upon one end of which is secured a collar 2 and secured to the inner end of this collar is a rotor disk 3 having buckets 4 secured to one face thereof adjacent its periphery and arranged in concentric rows to cooperate with similar alternating rows of buckets 5 on a disk-like fixed end wall 6 of the turbine engine casing, which casing forms a water chamber 7 within which chamber is located an annular combustion chamber 8 secured to the side of the wall 6 and having outlets 9 through said wall arranged to direct the expanding gases in said chamber into or between said buckets and by the expanding force of these burning gases, rotate the rotor plate 3 and its drive shaft 1, the burned gases escaping radially outward into an annular exhaust manifold 10 which is secured at one side to the turbine casing with its opposite side spaced from the free side of the rotor plate 3 and its inner side open to receive the peripheral portion of said plate which is provided with a series of bolts or pins projecting laterally therefrom at the side thereof opposite said buckets 3 to carry a series of annular, spaced apart fin plates 11 between which atmospheric air is forced radially outward into said manifold, by radial blades 12 on said plate 3, extending from said hub 2 outwardly to the periphery of said plate. These fin plates thus serve to dissipate the heat of the bucket carrying portion of said plate, and, in turn, are cooled by the air forced therebetween by the blades 12 on the rotor plate.

As shown in Fig. 6, the water chamber or jacket is connected with the water tanks of a radiator 13 of the usual construction, by pipes 14, said radiator shell being provided with a lateral flange 15 surrounding its core and projecting laterally from its shell to support said radiator upon said manifold 10 with its core opposite the blades 12 so that air will be drawn directly through said core by said blades and forced into said manifold past said fin plates 11 to effectually cool the rotor of the turbine, the water from the radiator being circulated through the chamber 7 of the turbine casing to effect further cooling of the engine.

To supply a combustible mixture to said combustion chamber 8, the circular wall 6a which forms the rear wall of the water chamber 7 of the engine casing, is provided with air inlet nozzles 16, each opening into said chamber and into the outer end of each of which nozzles, a fuel spray nozzle 17 projects, the end of each fuel nozzle being spaced from the tapered end of the bore of the air nozzle into which it projects, so that fuel and air in the form of a combustible mixture will be injected into said combustion chamber for maintaining combustion therein, the mixture being continuously ignited by the flame maintained in said chamber as it enters the chamber under pressure, to provide, by its expansive force, power to drive the rotor as these expanding gases are directed against the buckets thereof by the buckets of the stator. Means, not shown, will be provided for initially firing the explosive mixture, in starting the engine.

A circular plate 18 forms the rear wall of the turbine casing and this plate carries the several fuel nozzles 17, said plate or wall being formed to provide an annular fuel passage 19 having radial branches, one leading to each nozzle 17 to supply liquid fuel to all of said nozzles simultaneously and continuously during engine operation, and to force liquid fuel into this annular passage under considerable pressure, a fuel line 20 leads therefrom to the outlet of a suitable rotary pump 21 shown in Figs. 6 and 7.

The plate 18 is spaced from the wall 6a to form a circular air chamber 22, the periphery of this chamber being closed by a suitable wall, and extending across this chamber are the several fuel nozzles 17, air under pressure within said chamber, supplying the air nozzles 16 which open at their inlet ends into said chamber. Air under pressure is forced into said chamber 22 through an axial passage 23 formed between a pair of fixed or stationary sleeves, the inner one 23a of which is sleeved over the drive shaft 1 which turns freely therein and independently thereof, and the outer one, 23b which is held concentric therewith and spaced therefrom to form said annular air passage 23 therebetween. The forward end of the sleeve 23a is rigidly secured to the inner edge of the fixed wall 6a of the engine casing, which wall forms one side of said air chamber 22, a block or disk 24 forming such connection and serving to close the forward end of said passage 23, and the forward end of the sleeve 23b is rigidly secured in any suitable manner to the inner edge of the plate 18 forming the rear side wall of said air chamber. Preferably said plate 18 is formed with a series of bosses 25 projecting laterally therefrom across said air chamber adjacent the inner edge of said plate to space said plate from the wall 6a, and long bolts 26 pass through openings in said bosses and are screwthreaded into openings in a corner block or ring 27 rigidly secured to the exterior of the sleeve 23b within the meeting angle of the end of said sleeve with the plate or wall 18. These bolts also extend through bores in the inner wall of the water chamber 7 which is formed integral with the inner edge of the wall 6a, and they also extend through holes in the wall 6 forming the front wall thereof and through holes in the block 24, so that the sleeves 23a and 23b are rigidly secured in concentric relation to the drive shaft and to each other with space between said sleeves in free communication with the center of the annular air chamber 22 to deliver air under pressure thereto without loss, there being no joints to cause leakage.

Air under pressure in the air chamber 22, in excess of that passing out through the air nozzles 16, is conducted away through an air pipe 28 connected in any suitable manner to one of the walls of the air chamber 22, and thus a flow of air under high pressure is provided for operating other parts or devices, said pipe 28 being extended to any desired point for the purpose.

The turbo air compressor pump comprises an outer cylindrical double rotor and an inner double stator, the fixed or stationary support for which stator is the outer sleeve or tube 23b which is rigidly secured at its forward end to the turbine casing or plate 18 forming the rear wall of said casing, and this rotor and stator, together with the rear end of the drive shaft 1, are supported within a supporting frame-work comprising hollow annular heads 29 and 30 rigidly connected together and to the rear end of the turbine casing, by long bolts passing through spacer sleeves 31 or tubes sleeved thereon between said heads. The forward head 29 comprises a flange 32 projecting laterally and rearwardly from the periphery of the plate 18 and a ring plate 33 secured to the free edge of said flange and extending inwardly a short distance, forming the rear wall of said head, which hollow head thus forms an annular air intake chamber 34 at the forward end of the turbo pump, said head having an air inlet opening at the upper side thereof over which inlet, the open end of an intake pipe or manifold 35 is secured by means of a bolt 36. The head 30 at the rear end of the turbo pump comprises a hollow annular member having a peripheral wall formed at its forward edge with an inwardly extending flange 37 forming one side wall of the head and a disk 38 forms the opposite side wall, the peripheral portion of said disk being rigidly secured in any suitable manner to said peripheral wall, the said disk being formed with a laterally extending hollow hub 39 to receive a suitable anti-friction bearing 40 for the reduced end portion of the drive shaft 1 which extends therethrough, said shaft being mounted adjacent its forward end in an anti-friction bearing 41 mounted in the hub or central annular wall of the turbine casing. This rear head 30 is formed, like said head 29 with an air inlet opening at the top and over which opening the opposite end of the air inlet manifold 35 is secured, said head 30 thus forming an air inlet chamber 42 at the rear end of the turbo pump.

The pipes 35 of the air intake manifold, the ends of which are secured to the heads 29 and 30, meet in an enlargement or casing 35a above and intermediate the ends of the turbo pump, and extending upwardly from this casing is an air inlet pipe or extension 43. Upon the upper end of this pipe 43 is mounted a circular air screen 44 having impervious top and bottom walls between the peripheries of which the screen is secured, and said air inlet pipe is extended with its upper end open intermediate said top and bottom impervious ends of said air cleaner or screen member so that air will be drawn evenly through the screen and all dust or other solid particles removed from the air by said screen. Within this air intake pipe 43 is a throttle valve 45 which may be operated from a distant point by the usual connections, to choke the inlet of air and control the operation of the turbine. On the lower end of tube 43 or on a tube secured therein as shown, is secured a head 46 positioned midway between the top of the casing 35a and the upper open end of a downward extension 47 of said head to the lower end of which extension is secured the casing of the rotary fuel pump 21 of any suitable construction, the vertical shaft 48 of which fuel pump extends upwardly through a bearing provided in said extension 47 and to the upper end of which shaft, is secured a rotor 49 having blades or brackets to cooperate with stator buckets 50 on said head 46, outwardly curved conduits being provided on said head leading from openings therein to direct the air outwardly between the stator and rotor buckets and drive the fuel pump at a speed proportionate to the air flow which is regulated by a ring shutter 51 fitting within the downward tubular extension of said air inlet pipe above the head 46, said extension and ring being formed with a series of openings adapted to be brought into registry by adjusting said ring by means of a handle 52 shown in Fig. 8, on the ring, projecting outwardly through a slot in the wall of said casing 35a. By rotating said shutter, the flow of air through said shutter openings may be restricted, thus directing a greater proportion of the flow to the rotor 49 to speed up the fuel pump and force a greater amount of fuel to the nozzles of the turbine engine.

The turbo compressor or air pump which is mounted between the heads 29 and 30 of the supporting frame, comprises an outer cylindrical rotor, hereinafter described, and a cooperating inner stator consisting of two sets or series of sections or members 53, the members of each set being graduated in thicknesses from each end of the stator and all strung upon the fixed sleeve 23b and rigidly secured thereto in spaced apart relation, by spacer rings 54 on said sleeve, the members of greatest thickness, being located at the ends of the stator and the members of each series gradually decreasing in thickness toward a double, centrally located stator member 55, said member having opposed side walls with radially extending outwardly and laterally curved blades 56 extending across the space between said walls, this center member thus providing radial passages between its blades, open at the periphery of the member to receive air and conduct it inwardly where it is discharged into the rear end of the air passage 23, said rear end of said passage being formed by a ring block 57 secured within the space between the sleeves 23a, 23b, the forward side of which ring is curved inwardly and forwardly to direct the air forwardly as it enters from the inner open ends of said passages between the blades of said mid stator member.

Each of the several stator members 53 is formed with a plurality of curved radial blades or fins 58 as shown in Fig. 2, which fins are adapted to direct air inwardly into buckets 59 from which it escapes outwardly and laterally into similar buckets on the external rotor. The series of members 53 at each side of the central air outlet member 55 are arranged to direct air toward said central member and as both series are rigidly secured to the sleeve 23b, no end thrust on the stator is present, the end thrust of one series being balanced by the end thrust of the other series, thus eliminating the necessity for thrust bearings and giving a running balance, and further, as the central air outlet stator member is located between the two series and also rigidly secured to the axial sleeve forming a stationary conduit for conducting the air away, there is no necessity for loose joints between running parts or other connections requiring packing to prevent leakage of air and which packing glands are always subject to wear and are always very hard to keep sufficiently tight to prevent leakage under the very high air pressure to which they are subjected in a turbo compressor.

The external tubular rotor of the turbo pump or air compressor, comprises an outer wall formed by two series of separate rotor ring members 60 with a central or intermediate double rotor member 61 interposed between the adjacent ends of the two series, and also end members 62 and 63, all rigidly secured together by long bolts 64 passing through openings in the outer body portions of all of said members, and thus the several sections or members are drawn tightly together, forming an outer cylindrical wall with the end members 62—63 forming inwardly extending end walls of sufficient strength to carry the load of the rotor. Each of these rotor members carries an inwardly extending bucket and blade arrangement indicated as a whole by the numeral 65 and adapted to cooperate with the buckets and blades of the stator members 53 in the usual manner.

Rigidly secured to the inner edge of the forward end rotor member 62, is a tubular portion 66 extending laterally and forwardly therefrom to form an end hub for the rotor and this tubular hub member is of considerably greater internal diameter than the external diameter of the portion of the sleeve 23b around which it extends, thus forming an annular air inlet passage 67 between said hub and sleeve, the forward end of which passage opens into the air intake chamber 34 of the head 29, and thus air is drawn by suction created by the operation of the turbo pump, from said chamber, into the forward end of said pump, a suitable anti-friction bearing indicated as a whole by the numeral 68, being mounted within and forming a part of the rear wall of said chamber 34 to support the forward end of the pump rotor.

The rotor member 63 at the rear end of the pump, is formed with a hub portion 63a adapted to be secured, in the manner hereinafter described, directly to the drive shaft 1 beyond the rear ends of the sleeves 23a, 23b, and this hub is secured to the inner edge of the inwardly extending end wall of said member 63, said hub being formed with a horizontal annular space or inlet air passage 69 therethrough, open at its rear end directly into the air inlet chamber 42 of the rear head 30 and delivering air at its forward end into an annular space or passage formed between said end wall of the member 63 and a disk 70 formed integral with the inner end of said hub 63a and provided with suitable blades extending across said space adjacent the periphery of said disk to deliver air around the outer edge of said disk, into the outer ends of the several passages formed between the blades of the adjacent stator. The rotor of the pump is thus rotated by the drive shaft through the connection of said hub 63a with said shaft, and this hub is mounted within an anti-friction bearing 68 mounted on the inner wall of said chamber of said head 30 in the same manner as the bearing 68 for the forward end of the rotor, this rear end bearing being of the same construction as the forward end bearing.

The several rotor members 60 of each series are of graduated thicknesses to correspond with the series of stator members opposed thereto, and the buckets and blades of each series of rotors are arranged to force air toward the mid air-outlet stator 55, from each end of the rotor, and as all of the rotor members are rigidly secured together, and pressure on the rotor in either direction is eliminated, as the end pressure developed by one series is counterbalanced by the other series, and as the stator and rotor of the pump are both relieved of all end thrust by this double opposed arrangement of two series of members for each, a very smooth running evenly balanced turbo pump is secured.

Obviously it would be quite difficult to mount and hold the rotor exactly concentric with the axis of the drive shaft 1, which would be necessary, due to the very high speed and large diameter of the rotor, provided the hub of the rotor be rigidly secured directly to said shaft, and therefore a slightly yieldable driving connection is provided between hub 63a and shaft 1 as shown in detail in Fig. 10, an externally toothed or ribbed member 71 being splined or otherwise rigidly secured to said shaft 1 and the inner diameter of said hub being formed with similar teeth or ribs, the teeth 72 on the hub being located opposite the grooves or spaces between the teeth 73 on said member 71 with a space therebetween with these teeth only partially intermeshed, so that a filling 74 of rubber or other suitable material may be vulcanized into this space, completely covering the teeth on both parts to prevent direct contact of the teeth on one part with those on the other, but permitting a slight relative movement, so that should the rotor be just slightly eccentric to the axis of the shaft, at the very high speed attained by the rotor, it may find its center of rotation, this rubber filling between the intermeshing driving teeth, being compressed just sufficiently to permit such action.

As the end hubs of the rotor are each provided with an inlet air passage passing therethrough and surrounding the drive shaft, these hubs are of necessity, of large diameter, and, therefore, each of the bearings 68 must be of large diameter. Further, due to the high speed at which the rotor is driven, such bearings if of the usual ball or roller construction will heat rapidly at such high speeds as the balls or rollers have a long path of travel and such a bearing will "freeze" due to extreme friction, and become inoperative. To overcome these difficulties, applicant provides a bearing wherein the load is carried by a series of wheels 75 (see Figs. 1 and 4) running upon the exterior surface of the rotor hub and each wheel has an integral axial shaft 76 of small diameter running upon circular tracks 77, one at each side of said wheels 75, said tracks forming the inner peripheral edges of a cage ring 78 which is of substantially inverted U-shape in cross section to span and enclose the upper or outer part of each wheel of the series, the peripheries of said wheels opposite their points of contact with the hub of the rotor, being spaced from said cage ring so that the load on this cage ring will be carried by the edges or tracks 77 thereof in contact with the surfaces of the projecting end portions of the wheel shafts or pintles 76, only. The speed of rotation of the wheels 75, which are of comparatively large diameter running in contact with the rotor hub, is therefore not excessive, and the small diameter wheel pintles running upon the tracks 77 of large diameter, carries said train of wheel around the hub at a very low speed, said wheels of the train being connected and spaced apart by a pair of spacer rings 79, one at each side of said wheels, and having openings to receive said wheel pintles.

A bearing casing comprising opposite side walls 80, encloses the bearing structure, these walls being secured in any suitable manner to opposite sides of the cage ring 78 and formed at their lower edges with grooves to receive packing to contact the hub and close the casing against dust and dirt, this casing being secured to the inwardly extending flange 33 or 37 forming the side wall of one of the heads 29 or 30, said casing extending inward therefrom and forming the remainder of said wall to extend inward to the hub of the rotor and close the side of the air intake chamber 34 or 42 of said head. To prevent the transmission of the vibration of the rotor to the supporting frame of which said heads form a part, an angle ring 81 is secured to the inner face of each flange 33, 37 and with the inner edge portion of said flange, forms an inwardly open channel to receive the outer portion of the bearing casing walls 80 and cage ring 78, this channel being lined with rubber or other suitable material 82 to insulate said casing from the channel and to yield slightly, the bearing casing compressing said rubber lining, and thus vibrations set up in the rotor at high speeds, are dampened.

With the present arrangement, a very compact and efficient structure of minimum weight and maximum pump capacity is secured, loss of air due to leakage is eliminated by the double opposed arrangement of rotor and stator member, as well as end thrust thereon, and the combining of the turbine engine and turbo pump, in the manner set forth, makes it possible to operate the turbine by a continuous feeding of explosive mixture into a single combustion chamber and expansion of gases therein by continuous burning of this mixture within said chamber. Further, this arrangement and combination of turbine and turbo pump, provides for supplying a continuous flow of air under high pressure to the engine for admixture with fuel, and for the utilization of the excess of such air over that admitted to the engine, as power for driving other devices, the arrangement making such utilization most convenient and effective.

Obviously many changes may be made in the construction and arrangement, within the scope of the appended claims, and such changes are contemplated.

Having thus fully described my invention, what I claim is:—

1. In a turbo air compressor, the combination of an external rotor having an air intake at each end, a manifold connecting said intakes, an internal stator having an air outlet intermediate its ends, a fixed axial member to which said stator is secured, said axial member forming an air outlet passage in communication with said air outlet of said stator, and means for rotating said rotor including a shaft extending axially through said axial member, and a motor attached to the outer end of said shaft.

2. In a turbo air compressor, the combination of an internal rotor and a co-operating internal stator, said rotor and stator arranged to simultaneously draw in air at opposite ends thereof and discharge the same intermediate said ends, said stator having an outlet for said air intermediate its ends, a fixed tubular member to which said stator is secured extending axially thereof and forming an air outlet communicating with said outlet of said stator, a drive shaft within said tubular member extending axially therethrough and to one end of which said rotor is secured, and means connected to the opposite end of said shaft for driving said shaft and rotor.

3. A turbo air compressor including a rotor and a co-operating stator arranged one within the other to force air in opposite directions between said rotor and stator longitudinally thereof, and together forming a cylindrical structure, a frame including a hollow circular head at each end of said structure and forming air chambers, and a tubular member extending axially of said structure and forming an air conduit communicating with said space between said rotor and stator intermediate the ends thereof.

4. A turbo air compressor including an external rotor and an internal stator, said rotor forming a cylindrical casing for said stator and co-operating therewith to draw in air at both ends of said rotor, said internal stator having an air outlet intermediate its ends, a frame having a head at each end of and supporting said rotor, each head forming an air chamber to supply air to the space between said rotor and stator, a fixed axial tubular member to which said stator is secured and communicating with said outlet of said stator, a drive shaft extending within said tubular member and secured adjacent one end to said rotor to drive the same, and power means applied to the opposite end of said shaft.

5. A turbo air compressor including an external rotor and an internal stator, said rotor forming a casing enclosing said stator and provided with their hubs formed with air passages to conduct air into the space between said rotor and stator at each end of said rotor, a supporting frame including a head at each end of said rotor and each forming an air chamber in communication with the air passages through said hubs, bearings on said heads engaging the exterior of said hubs, a tubular member fixed at one end to one of said hubs axially of said stator and rotor and opening through the chamber of said head at its outer end and communicating at its inner end with the space between said rotor and stator intermediate the ends of said stator, and an air chamber into which the open end of said tubular member opens to conduct air under pressure into said air chamber.

6. A turbo air compressor including a rotor and a stator co-operating to draw air into both ends of the structure and force it longitudinally thereof in opposite directions and discharge the same intermediate the ends of the rotor, a supporting frame for said structure including a hollow head at each end of said rotor with the interior of said heads in communication with the interior space between said rotor and stator, and an air intake manifold connected at its ends to said heads.

7. In a turbo compressor, the combination of an external rotor and a co-operating internal stator, hubs at the ends of said rotor, means within which said hubs are journalled, a fixed tubular member extending longitudinally through one of said hubs with a space between the exterior thereof and the interior of the hub to form an air passage communicating with a space between stator and rotor, said stator being secured to said fixed tubular member, a drive shaft within said tubular member extending therethrough and secured at one end to said rotor to drive the same, and means for driving said drive shaft, and an air chamber into which the open end of said air passage formed by said fixed tubular member opens to deliver air under pressure to said chamber, said air chamber having an air outlet to conduct air under pressure therefrom.

8. A device of the character described comprising a turbo air pump having a rotor and a stator together forming a cylindrical structure, a drive shaft extending axially through said structure, and means forming a driving connection between said shaft and said rotor of said pump structure, said means including a hub on said rotor formed with internal projections, a member secured on said shaft and having external projections to engage between said projections on said hub, and a yieldable filling between said projections on said hub and member to separate the same and prevent engagement therebetween, said filling means being adapted to yield under driving torque of said shaft and to prevent the transmission of vibrations between said shaft and said rotor.

9. A device of the character described including an external rotor and a co-operating internal stator together forming a cylindrical turbo air pump; a hub on said rotor projecting axially from an end thereof and forming an air passage extending therethrough and opening into said pump; a supporting frame; and supporting means interposed between said frame and said hub, said supporting means comprising a series of wheels to travel upon the exterior of said hub, each of said wheels being provided with an axial member of lesser diameter than the diameter of said wheels, a track on said frame upon which said axial members of said wheels travel, and means for holding said wheels in spaced apart relation.

10. A device of the character described including an external rotor and a co-operating internal stator together forming a cylindrical turbo air pump; hubs on the ends of said rotor providing air intake passages extending therethrough longitudinally thereof; an axial member to which said stator is secured and extending through one of said hubs to form an air outlet passage; a supporting frame; and supporting means for each hub carried by said frame, each of said means including a series of wheels to travel upon the exterior of said hubs, each wheel having laterally extending axial pintles, a cage mounted in said frame and provided with annular tracks upon which said pintles travel, and spacer rings engaging said pintles to hold said wheels in spaced relation.

11. A device of the character described and as characterized in claim 10, said supporting means for said hubs including means for resiliently mounting said cages in said frame, whereby said rotor may find its center of rotation at high speeds.

12. A turbo air compressor comprising an external rotor and a cooperating internal stator having an air outlet intermediate its ends, a supporting frame for said rotor and stator including a hollow head at each end of said rotor, each of said heads being in communication with the space between said rotor and stator, an axial tubular member fixed at its ends in said heads and into which said air outlet opens, a drive shaft extending through said tubular member and mounted in bearings carried by said heads, an intake manifold having its ends connected to said heads to deliver air thereto, and means within said manifold for regulating the air passing therethrough.

13. A device of the character described including a supporting structure, a rotor and a cooperating stator mounted in said structure with their common axis extending horizontally, a fixed axial member to which said stator is secured and formed with an air outlet passage, an axial shaft within said fixed axial member and free to rotate independently thereof, means for driving said shaft secured to one end thereof at one end of said rotor and stator, an air compression chamber at one end of said rotor and stator and into which said air outlet passage opens, and means for conducting air into the space between said rotor and stator at both ends thereof.

JOHN O. HEINZE.